(12) United States Patent
Endo (10) Patent No.: US 12,479,164 B2
(45) Date of Patent: Nov. 25, 2025

(54) METHOD FOR MANUFACTURING THREE-DIMENSIONAL SHAPED OBJECT HAVING AN ABSORPTION UNIT CONFIGURED TO TEMPORARILY ABSORB SHAPING MATERIAL

(71) Applicant: SEIKO EPSON CORPORATION, Tokyo (JP)

(72) Inventor: Wataru Endo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 499 days.

(21) Appl. No.: 17/935,772

(22) Filed: Sep. 27, 2022

(65) Prior Publication Data
US 2023/0099180 A1  Mar. 30, 2023

(30) Foreign Application Priority Data
Sep. 28, 2021 (JP) ................................. 2021-157317

(51) Int. Cl.
  B29C 64/393 (2017.01)
  B33Y 30/00 (2015.01)
  B33Y 50/02 (2015.01)

(52) U.S. Cl.
  CPC ........... B29C 64/393 (2017.08); B33Y 30/00 (2014.12); B33Y 50/02 (2014.12)

(58) Field of Classification Search
  CPC .................................................. B29C 64/393
  See application file for complete search history.

(56) References Cited

U.S. PATENT DOCUMENTS

| 10,324,454 | B2 | 6/2019 | Maeda |
| 10,744,752 | B2 | 8/2020 | Shirakawa |
| 11,179,889 | B2 | 11/2021 | Mizukami et al. |
| 2017/0190119 | A1* | 7/2017 | Dow ............... B25J 9/1682 |
| 2017/0210116 | A1 | 7/2017 | Shirakawa |

(Continued)

FOREIGN PATENT DOCUMENTS

| CN | 110271180 | 3/2019 |
| JP | 2002-248692 | 9/2002 |

(Continued)

*Primary Examiner* — Suresh Suryawanshi
(74) *Attorney, Agent, or Firm* — WORKMAN NYDEGGER (57) ABSTRACT

Provided is a method for manufacturing a three-dimensional shaped object that manufactures a three-dimensional shaped object by stacking layers using a three-dimensional shaping device. The method for manufacturing a three-dimensional shaped object includes: a first step of acquiring first shaping data including path information indicating a movement path of a discharge unit that moves while discharging a shaping material, and discharge amount information indicating a discharge amount of the shaping material in the movement path; a second step of generating, based on device function information including information on a functional unit included in the three-dimensional shaping device, second shaping data by adding control data for controlling the functional unit to the first shaping data or by changing the control data included in the first shaping data; and a third step of controlling the three-dimensional shaping device in accordance with the second shaping data to shape the three-dimensional shaped object.

10 Claims, 6 Drawing Sheets

(56) References Cited

U.S. PATENT DOCUMENTS

| | | |
|---|---|---|
| 2017/0266884 A1 | 9/2017 | Maeda |
| 2018/0056390 A1* | 3/2018 | O'Neill ................. B29C 64/236 |
| 2019/0283320 A1* | 9/2019 | Mizukami ............. B29C 64/106 |
| 2020/0023434 A1* | 1/2020 | Kaji ........................ B22F 10/85 |
| 2020/0122407 A1* | 4/2020 | Yamazaki ............... B22F 10/30 |
| 2020/0269514 A1 | 8/2020 | Yamamoto |
| 2021/0237362 A1* | 8/2021 | Yamazaki .......... G05B 19/4099 |

FOREIGN PATENT DOCUMENTS

| | | |
|---|---|---|
| JP | 2017-134547 | 8/2017 |
| JP | 2017-165041 | 9/2017 |
| JP | 2018-176460 A | 11/2018 |
| JP | 2019-155833 A | 9/2019 |
| JP | 2019-182918 | 10/2019 |
| JP | 2020-138394 A | 9/2020 |

\* cited by examiner

| No. | INFORMATION ON FUNCTIONAL UNIT | LIMIT CONTROL VALUE |
|---|---|---|
| 1 | NOZZLE OFFSET COORDINATES | (±50,±50,±50) |
| 2 | USED NOZZLE NUMBER | 1 |
| 3 | NOZZLE MOVEMENT SPEED | 100% |
| 4 | SPEED CONTROL ACCORDING TO LINE WIDTH | |
| 5 | NOZZLE MOVEMENT ACCELERATION | 100% |
| 6 | USED MATERIAL | A MATERIAL, B MATERIAL, C MATERIAL |
| 7 | STAGE TEMPERATURE | 350°C |
| 8 | CHAMBER TEMPERATURE | 350°C |
| 9 | FLAT SCREW NUMBER | 1 |
| 10 | FLAT SCREW ROTATION SPEED | 10000 |
| 11 | BARREL TEMPERATURE | 350°C |
| 12 | FLAT SCREW PRESSURE VALUE | 100% |
| 13 | BUTTERFLY VALVE POSITION | 90 DEGREE |
| 14 | PLUNGER POSITION | 100% |
| 15 | SPEED CONTROL DURING CORNER MOVEMENT | |
| 16 | STOP CONTROL AT ACUTE ANGLE PORTION | |
| 17 | CLEANING PROCESSING | |
| 18 | UPPER HEATER TEMPERATURE | 350°C |
| 19 | RETRACTION POSITION | |
| 20 | SIGN OF START/END OF PROCESSING | |
| 21 | UNWINDING/CUTTING OF FIBER MATERIAL | |

METHOD FOR MANUFACTURING THREE-DIMENSIONAL SHAPED OBJECT HAVING AN ABSORPTION UNIT CONFIGURED TO TEMPORARILY ABSORB SHAPING MATERIAL

The present application is based on, and claims priority from JP Application Serial Number 2021-157317, filed Sep. 28, 2021, the disclosure of which is hereby incorporated by reference herein in its entirety.

BACKGROUND

1. Technical Field

The present disclosure relates to a method for manufacturing a three-dimensional shaped object, a three-dimensional shaping system, and an information processing apparatus.

2. Related Art

JP-A-2020-138394 discloses a three-dimensional shaping device that divides a three-dimensional object to be shaped by a stacking pitch unit to generate shaping data indicating a shape of a shaping layer for shaping each layer to be stacked, and controls a shaping operation based on the shaping data.

When the three-dimensional shaping device has a function specific to the device, in order to perform shaping using shaping data generated by general-purpose software, it is necessary to manually add control data for controlling the function specific to the device.

SUMMARY

According to a first aspect of the present disclosure, there is provided a method for manufacturing a three-dimensional shaped object that manufactures a three-dimensional shaped object by stacking layers using a three-dimensional shaping device. The method for manufacturing a three-dimensional shaped object includes: a first step of acquiring first shaping data including path information indicating a movement path of a discharge unit that moves while discharging a shaping material, and discharge amount information indicating a discharge amount of the shaping material in the movement path; a second step of generating, based on device function information including information on a functional unit included in the three-dimensional shaping device, second shaping data by adding control data for controlling the functional unit to the first shaping data or by changing the control data included in the first shaping data; and a third step of controlling the three-dimensional shaping device in accordance with the second shaping data to shape the three-dimensional shaped object.

According to a second aspect of the present disclosure, a three-dimensional shaping system is provided. This three-dimensional shaping system includes an information processing apparatus, and a three-dimensional shaping device. The information processing apparatus includes: a first shaping data acquisition unit configured to acquire first shaping data including path information indicating a movement path of a discharge unit that moves while discharging a shaping material, and discharge amount information indicating a discharge amount of the shaping material in the movement path; and a second shaping data generation unit configured to generate, based on device function information including information on a functional unit included in the three-dimensional shaping device, second shaping data by adding control data for controlling the functional unit to the first shaping data or by changing the control data included in the first shaping data. The three-dimensional shaping device includes: a second shaping data acquisition unit configured to acquire the second shaping data; and a shaping control unit configured to shape a three-dimensional shaped object on a stage by discharging the shaping material from the discharge unit and stacking layers while moving the discharge unit with respect to the stage according to the second shaping data.

According to a third aspect of the present disclosure, an information processing apparatus is provided. The information processing apparatus includes: a first shaping data acquisition unit configured to acquire first shaping data including path information indicating a movement path of a discharge unit that moves while discharging a shaping material, and discharge amount information indicating a discharge amount of the shaping material in the movement path; and a second shaping data generation unit configured to generate, based on device function information including information on a functional unit included in the three-dimensional shaping device, second shaping data by adding control data for controlling the functional unit to the first shaping data or by changing the control data included in the first shaping data.

DESCRIPTION OF EXEMPLARY EMBODIMENTS

A. First Embodiment

Figure 1:
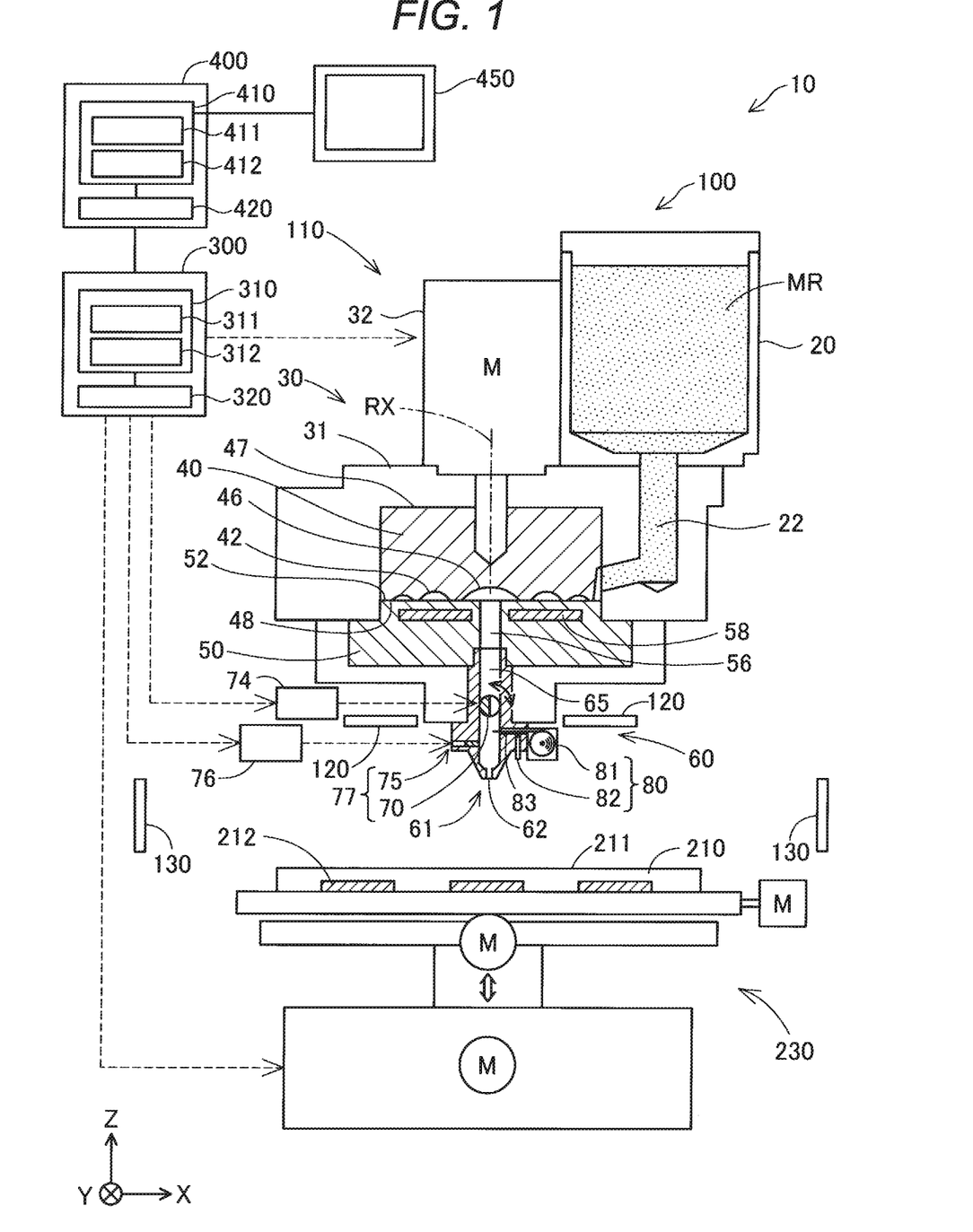
FIG. 1 is an illustrative diagram showing a schematic configuration of a three-dimensional shaping system.

FIG. 1 is an illustrative diagram showing a schematic configuration of a three-dimensional shaping system 10 according to a first embodiment. FIG. 1 shows arrows indicating X, Y, and Z directions orthogonal to one another. The X direction and the Y direction are directions parallel to a horizontal plane, and the Z direction is a direction along a vertically upward direction. The arrows indicating the X, Y, and Z directions are appropriately shown in other drawings such that the shown directions correspond to those in FIG. 1. In the following description, when a direction is specified, a direction indicated by an arrow in each drawing is referred to as "+", a direction opposite thereto is referred to as "−", and a positive or negative sign is used in combination with a direction notation. Hereinafter, a +Z direction is also referred to as "upper", and a −Z direction is also referred to as "lower".

The three-dimensional shaping system 10 includes a three-dimensional shaping device 100 and an information processing apparatus 400. The three-dimensional shaping device 100 includes a control unit 300 for controlling each unit of the three-dimensional shaping device 100. The control unit 300 and the information processing apparatus 400 are coupled to each other via a predetermined communication interface.

The three-dimensional shaping device 100 includes a shaping unit 110 that generates and discharges a shaping material, a shaping stage 210 as a base of a three-dimensional shaped object, and a moving mechanism 230 that controls a discharge position of the shaping material. At least the shaping unit 110 and the stage 210 are disposed in a chamber (not shown). The chamber is provided with a chamber heater 130 for heating an inside of the chamber. The chamber heater 130 is controlled by the control unit 300.

Under control of the control unit 300, the shaping unit 110 discharges the shaping material obtained by plasticizing a material in a solid state onto the stage 210. The shaping unit 110 includes a material supply unit 20 as a supply source of a raw material before being converted into the shaping material, a plasticizing unit 30 that converts the raw material into the shaping material, and a discharge unit 60 that discharges the shaping material.

The material supply unit 20 supplies a raw material MR to the plasticizing unit 30. The material supply unit 20 is configured with, for example, a hopper in which the raw material MR is accommodated. The material supply unit 20 is coupled to the plasticizing unit 30 via a communication path 22. The raw material MR is put into the material supply unit 20 in a form of pellets, powders, and the like. In the present embodiment, a pellet-shaped ABS resin material is used.

The plasticizing unit 30 plasticizes the raw material MR supplied from the material supply unit 20 to generate a paste-shaped shaping material exhibiting fluidity, and guides the shaping material to the discharge unit 60. In the present embodiment, the term "plasticizing" is a concept including melting, and refers to a change from a solid state to a flowable state. Specifically, in a case of a material in which glass transition occurs, the "plasticizing" refers to setting a temperature of the material to be equal to or higher than a glass transition point. In a case of a material in which the glass transition does not occur, the "plasticizing" refers to setting a temperature of the material to be equal to or higher than a melting point.

The plasticizing unit 30 includes a screw case 31, a drive motor 32, a flat screw 40, and a barrel 50. The flat screw 40 is also referred to as a rotor or a scroll. The barrel 50 is also referred to as a screw facing portion.

Figure 2:
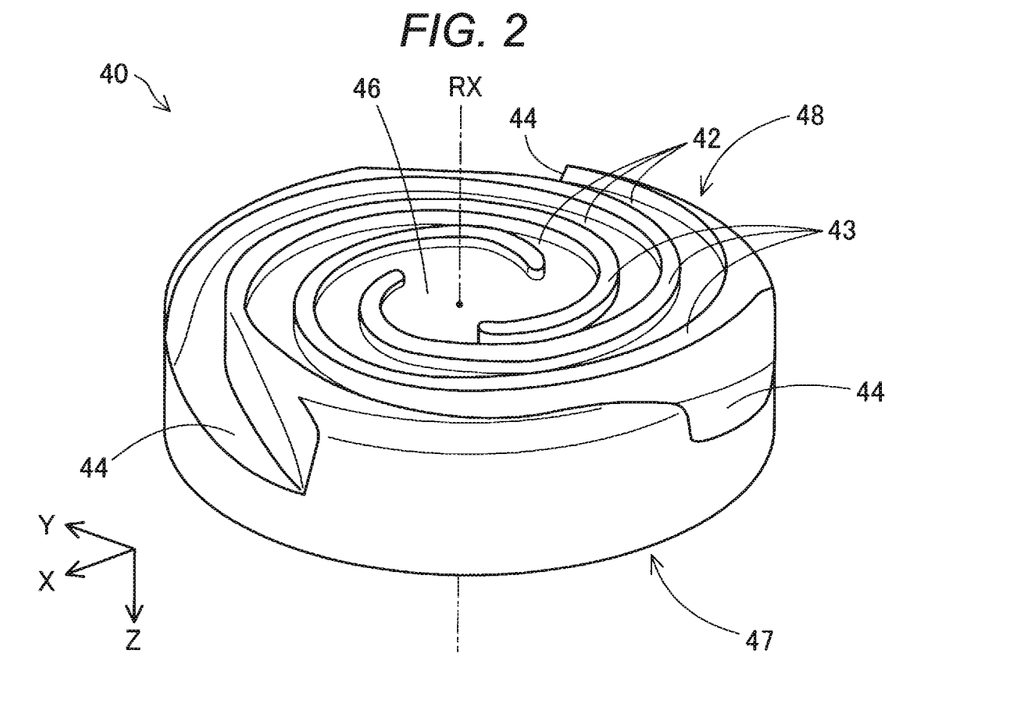
FIG. 2 is a perspective view showing a schematic configuration of a flat screw.
Figure 3:
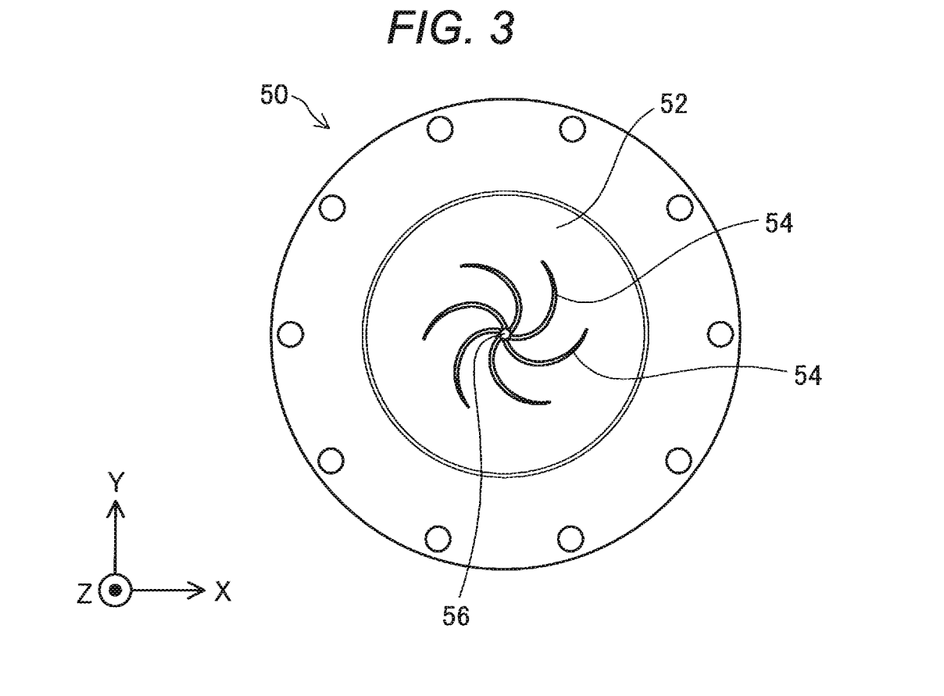
FIG. 3 is a schematic plan view of a barrel.

FIG. 2 is a perspective view showing a schematic configuration of a lower surface 48 side of the flat screw 40. In order to facilitate understanding of the technique, the flat screw 40 shown in FIG. 2 is shown in a state where a positional relationship between an upper surface 47 and the lower surface 48 shown in FIG. 1 is reversed in a vertical direction. FIG. 3 is a schematic plan view showing an upper surface 52 side of the barrel 50. The flat screw 40 has a substantially cylindrical shape whose height in an axial direction, which is a direction along a center axis of the flat screw 40, is smaller than a diameter. The flat screw 40 is disposed such that a rotation axis RX serving as a rotation center of the flat screw 40 is parallel to the Z direction.

The flat screw 40 is accommodated in the screw case 31. An upper surface 47 side of the flat screw 40 is coupled to the drive motor 32, and the flat screw 40 is rotated in the screw case 31 by a rotational drive force generated by the drive motor 32. The drive motor 32 performs driving under the control of the control unit 300. The flat screw 40 may be driven by the drive motor 32 via a speed reducer.

Spiral groove portions 42 are formed in the lower surface 48 of the flat screw 40 which is a surface intersecting with the rotation axis RX. The communication path 22 of the above-described material supply unit 20 communicates with the groove portions 42 from a side surface of the flat screw 40. As shown in FIG. 2, in the present embodiment, three groove portions 42 are formed so as to be separated from one another by ridge portions 43. The number of the groove portions 42 is not limited to three, and may be one or two or more. A shape of the groove portion 42 is not limited to the spiral shape, and may be a helical shape or an involute curve shape, or may be a shape extending so as to draw an arc from a center portion toward an outer periphery.

The lower surface 48 of the flat screw 40 faces the upper surface 52 of the barrel 50, and a space is formed between the groove portions 42 of the lower surface 48 of the flat screw 40 and the upper surface 52 of the barrel 50. The raw material MR is supplied from the material supply unit 20 to this space between the flat screw 40 and the barrel 50 through material inflow ports 44 shown in FIG. 2.

A barrel heater 58 for heating the raw material MR supplied into the groove portions 42 of the rotating flat screw 40 is embedded in the barrel 50. A communication hole 56 is provided at a center of the barrel 50. A plurality of guide grooves 54 coupled to the communication hole 56 and extending in a spiral shape from the communication hole 56 toward the outer periphery are formed on the upper surface 52 of the barrel 50. One end of the guide groove 54 may not be coupled to the communication hole 56. The guide grooves 54 may be omitted.

The raw material MR supplied into the groove portions 42 of the flat screw 40 flows along the groove portions 42 by the rotation of the flat screw 40 while being plasticized in the groove portions 42, and is guided to a center portion 46 of the flat screw 40 as the shaping material. The paste-shaped shaping material that flows into the center portion 46 and exhibits fluidity is supplied to the discharge unit 60 via the communication hole 56 provided at the center of the barrel 50. In the shaping material, not all types of substances constituting the shaping material may be melted. The shaping material may be converted into a state having fluidity as a whole by melting at least a part of types of substances of the all types of substances constituting the shaping material.

The discharge unit 60 includes a nozzle 61 that discharges the shaping material, a flow path 65 for the shaping material provided between the flat screw 40 and a nozzle opening 62, a discharge control unit 77 that controls the discharge of the shaping material, and a fiber supply unit 80.

The nozzle 61 is coupled to the communication hole 56 of the barrel 50 through the flow path 65. The nozzle 61 discharges the shaping material generated in the plasticizing unit 30 from the nozzle opening 62 at a tip end toward the stage 210.

An upper heater 120 that prevents a decrease in temperature of the shaping material discharged onto the stage 210 may be disposed around the nozzle 61. The upper heater 120 is controlled by the control unit 300.

The discharge control unit 77 includes a discharge adjustment unit 70 that opens and closes the flow path 65, and an absorption unit 75 that absorbs and temporarily stores the shaping material.

The discharge adjustment unit 70 is provided in the flow path 65, and changes an opening degree of the flow path 65 by rotating in the flow path 65. In the present embodiment, the discharge adjustment unit 70 is formed by a butterfly valve. The discharge adjustment unit 70 is driven by a first drive unit 74 under the control of the control unit 300. The first drive unit 74 is formed by, for example, a stepping motor. The control unit 300 controls a rotation angle of the butterfly valve by using the first drive unit 74, so that a flow rate of the shaping material flowing from the plasticizing unit 30 to the nozzle 61, that is, a discharge amount of the shaping material discharged from the nozzle 61 can be adjusted. The discharge adjustment unit 70 can adjust the discharge amount of the shaping material and can control ON/OFF of an outflow of the shaping material.

The absorption unit 75 is coupled between the discharge adjustment unit 70 and the nozzle opening 62 in the flow path 65. The absorption unit 75 temporarily absorbs the shaping material in the flow path 65 when the discharge of the shaping material from the nozzle 61 is stopped, thereby preventing an elongating phenomenon in which the shaping material drips in a stringy manner from the nozzle opening 62. In the present embodiment, the absorption unit 75 is formed by a plunger. The absorption unit 75 is driven by a second drive unit 76 under the control of the control unit 300. The second drive unit 76 is formed by, for example, a stepping motor, or a rack-and-pinion mechanism that converts a rotational force of a stepping motor into a translational motion of a plunger.

The fiber supply unit 80 supplies a fiber into the flow path 65. The fiber supply unit 80 includes a fiber accommodation unit 81 and a fiber cutting mechanism 82. A roll around which a fiber is wound is disposed in the fiber accommodation unit 81. The fiber accommodation unit 81 and the flow path 65 communicate with each other through an introduction path 83 that causes the fiber accommodation unit 81 to communicate with the flow path 65.

The fiber is a bundle of fiber materials having a substantially circular cross-sectional shape. For example, the fiber is a fiber material in a bundle manner in which a plurality of carbon fibers each having a diameter of 10 micrometers are bundled by a sizing agent. As the fiber, in addition to the carbon fiber, various materials having an elastic modulus higher than that of a resin material, such as a glass fiber, can be applied.

The fiber is fed out from the fiber accommodation unit 81 and introduced into the flow path 65 via the introduction path 83 by rotating the roll around which the fiber is wound under the control of the control unit 300. The fiber introduced into the flow path 65 flows in the flow path 65 along a flow of the shaping material flowing in the flow path 65. A composite material of the shaping material and the fiber is formed by introducing the fiber into the shaping material flowing in the flow path 65. The composite material formed in the flow path 65 flows in the flow path 65 and is sent out from the nozzle opening 62 of the nozzle 61 toward the stage 210.

The fiber cutting mechanism 82 includes a cutter protruding into the introduction path 83. The cutter is driven under the control of the control unit 300, and cuts the fiber in the introduction path 83. The fiber cutting mechanism 82 may be provided around the nozzle opening 62 to cut the composite material of the fiber and the shaping material sent out from the nozzle 61.

The fiber supply unit 80 may be used in a case of shaping a three-dimensional shaped object by using the composite material, and the three-dimensional shaping device 100 may shape a three-dimensional shaped object by using only the shaping material without using the composite material.

The stage 210 is disposed at a position facing the nozzle opening 62 of the nozzle 61. In the first embodiment, a shaping surface 211 of the stage 210 facing the nozzle opening 62 of the nozzle 61 is disposed so as to be parallel to the X and Y directions, that is, a horizontal direction. The stage 210 may be provided with a stage heater 212 for preventing the shaping material discharged onto the stage 210 from rapid cooling. The stage heater 212 is controlled by the control unit 300.

The moving mechanism 230 changes a relative position between the stage 210 and the nozzle 61 under the control of the control unit 300. In the present embodiment, a position of the nozzle 61 is fixed, and the moving mechanism 230 moves the stage 210. The moving mechanism 230 is formed by a three-axis positioner that moves the stage 210 in three-axis directions of the X, Y, and Z directions by drive forces of three motors. In the present specification, unless otherwise specified, a movement of the nozzle 61 means that the nozzle 61 or the discharge unit 60 is respectively moved with respect to the stage 210.

In another embodiment, instead of the configuration in which the stage 210 is moved by the moving mechanism 230, a configuration in which the moving mechanism 230 moves the nozzle 61 with respect to the stage 210 in a state where the position of the stage 210 is fixed may be adopted. Further, a configuration in which the moving mechanism 230 moves the stage 210 in the Z direction, and moves the nozzle 61 in the X and Y directions, or a configuration in which the moving mechanism 230 moves the stage 210 in the X and Y directions, and moves the nozzle 61 in the Z direction may be adopted. With these configurations, the relative positional relationship between the nozzle 61 and the stage 210 can be changed.

In the present embodiment, the three-dimensional shaping device 100 includes one shaping unit 110, but the three-dimensional shaping device 100 may include two or more shaping units 110. In this case, for example, different shaping materials are discharged from different shaping units 110. A unique flat screw number is assigned to the flat screw 40 included in each shaping unit 110. In the present embodiment, the discharge unit 60 includes one nozzle 61, but the discharge unit 60 may include two or more nozzles 61. In this case, for example, shaping materials having different line widths are discharged from the different nozzles 61. When the discharge unit 60 includes two or more nozzles 61, the discharge unit 60 includes a switching valve for switching the nozzles 61 to be used. A unique nozzle number is assigned to each nozzle 61.

The information processing apparatus 400 is formed by a computer including one or a plurality of processors 410, a storage device 420 including a main storage device and an auxiliary storage device, and an input and output interface that receives a signal from the outside and outputs a signal to the outside. The processor 410 functions as a first shaping data acquisition unit 411 and a second shaping data generation unit 412 by executing a program stored in the storage device 420. A display unit 450 formed by a liquid crystal display, an organic EL display, or the like is coupled to the information processing apparatus 400.

The first shaping data acquisition unit 411 acquires first shaping data from another computer, a recording medium, or the storage device 420. The first shaping data includes path information indicating a movement path of the discharge unit 60 that moves while discharging the shaping material, and discharge amount information indicating the discharge amount of the shaping material in the movement path. The movement path of the discharge unit 60 refers to a path in which the nozzle 61 moves along the shaping surface 211 of the stage 210 while discharging the shaping material.

The path information includes a plurality of partial paths. Each of the partial paths is a linear path indicated by a start point and an end point. The partial path is also referred to as a "path". The discharge amount information is individually associated with each partial path. In the present embodiment, the discharge amount indicated by the discharge amount information is a total amount of the shaping material discharged in the partial path.

Figure 4:
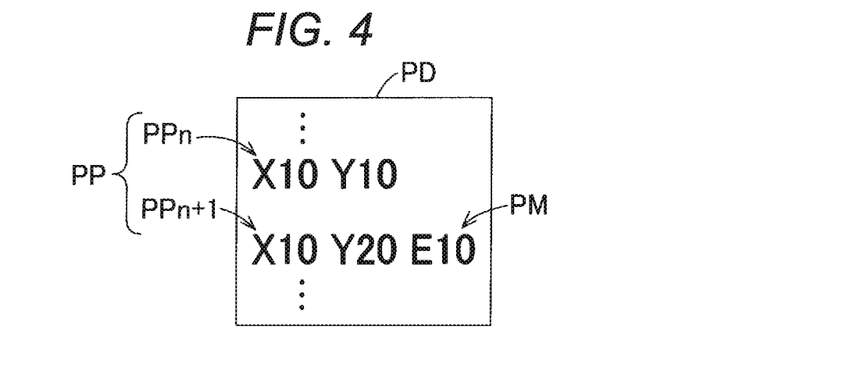
FIG. 4 is a diagram showing an example of first shaping data.

FIG. 4 is a diagram showing an example of the first shaping data. Information described in first shaping data PD is read and interpreted in order from an upper side to a lower side shown in FIG. 4. As described above, the first shaping data PD includes the path information and the discharge amount information. In FIG. 4, the path information is indicated by a path parameter PP. The discharge amount information is indicated by a discharge parameter PM.

The path parameter PP designates coordinates (X, Y) of a coordinate system having the X and Y directions as coordinate axes on the shaping surface 211 of the stage 210 where the nozzle 61 is to be positioned next. In the first shaping data PD, one partial path is specified by a set of two path parameters $PP_n$ and $PP_{n+1}$ arranged in a front-rear direction. A subscript "n" is any natural number.

In the example of FIG. 4, a partial path in which the nozzle 61 moves in the Y direction by a predetermined unit distance of +10 from coordinates (10, 10) to coordinates (10, 20) is specified by the set of two path parameters $PP_n$ and $PP_{n+1}$.

The discharge parameter PM is added after the path parameter PP. The discharge parameter PM designates an amount of the shaping material discharged while the nozzle 61 moves to the coordinates indicated by the path parameter PP. That is, the discharge parameter PM indicates a total amount of the shaping material disposed on the stage 210 in accordance with the movement of the nozzle 61 indicated by the partial path included in the first shaping data PD.

In the example of FIG. 4, an integer value indicating the amount of the shaping material represented by a predetermined unit amount is added after an alphabet "E" indicating the discharge parameter PM. In this example, it is designated that 10 unit amounts of the shaping material are discharged while the nozzle 61 is moved from the coordinates (10, 10) to the coordinates (10, 20).

The first shaping data PD is data that can also be used when a type of a shaping device that does not include the discharge adjustment unit 70 and the absorption unit 75 is caused to shape a three-dimensional shaped object. Specifically, the first shaping data PD has the same data type as data input to a 3D printer of a material extrusion method. Such first shaping data PD is generated by using known software referred to as a so-called slicer.

Based on device function information including information on functional units included in the three-dimensional shaping device 100, the second shaping data generation unit 412 of the information processing apparatus 400 shown in FIG. 1 generates second shaping data by adding control data for controlling these functional units to the first shaping data or by changing the control data included in the first shaping data. The functional units included in the three-dimensional shaping device 100 are, for example, the barrel heater 58, the upper heater 120, the stage heater 212, the chamber heater 130, the discharge adjustment unit 70, the absorption unit 75, and the fiber supply unit 80. The second shaping data generation unit 412 generates the second shaping data by adding the control data for controlling these functional units to the first shaping data, in addition to the path parameter and the discharge parameter shown in FIG. 4, or by changing the control data already included in the first shaping data. The second shaping data is data used by the three-dimensional shaping device 100 shaping a three-dimensional shaped object.

The control unit 300 is a control device controlling overall operations of the three-dimensional shaping device 100. The control unit 300 is formed by a computer including one or a plurality of processors 310, a storage device 320 including a main storage device and an auxiliary storage device, and an input and output interface that receives a signal from the outside and outputs a signal to the outside. The processor 310 functions as a second shaping data acquisition unit 311 and a shaping control unit 312 by executing a program stored in the storage device 320. Instead of being formed by the computer, the control unit 300 may be implemented by a configuration in which circuits are combined.

The second shaping data acquisition unit 311 acquires the second shaping data from the information processing apparatus 400.

The shaping control unit 312 shapes the three-dimensional shaped object on the stage 210 by discharging the shaping material from the discharge unit 60 and stacking layers while respectively moving the discharge unit 60 with respect to the stage 210 according to the path information and the discharge amount information included in the first shaping data. At this time, the shaping control unit 312 shapes the three-dimensional shaped object while controlling each functional unit provided in the three-dimensional shaping device 100 according to various types of control data included in the second shaping data.

Figure 5:
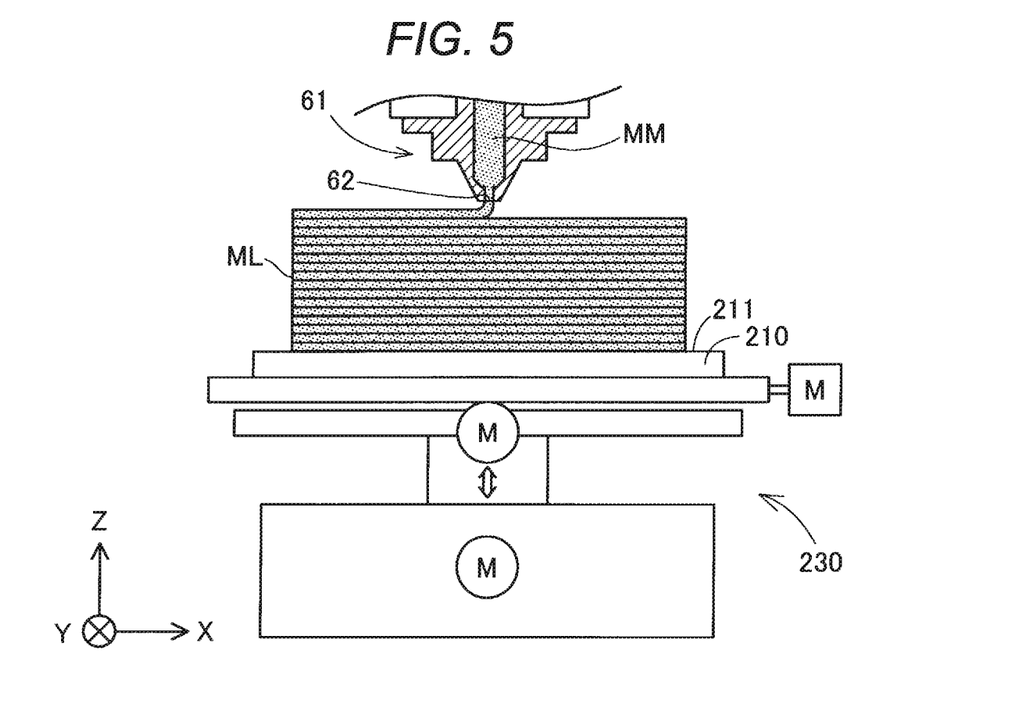
FIG. 5 is an illustrative diagram schematically showing a state in which a three-dimensional shaping device shapes a three-dimensional shaped object.

FIG. 5 is an illustrative diagram schematically showing a state in which the three-dimensional shaping device 100 shapes the three-dimensional shaped object according to the second shaping data. In the three-dimensional shaping device 100, as described above, the raw material MR in a solid state is plasticized to generate a shaping material MM. The control unit 300 causes the nozzle 61 to discharge the shaping material MM while maintaining a distance between the shaping surface 211 of the stage 210 and the nozzle 61 and changing the position of the nozzle 61 with respect to the stage 210 in a direction along the shaping surface 211 of the stage 210. The shaping material MM discharged from the nozzle 61 is continuously deposited in a moving direction of the nozzle 61.

The control unit 300 repeats the movement of the nozzle 61 to form layers ML. The control unit 300 relatively moves the position of the nozzle 61 with respect to the stage 210 in the Z direction after one layer ML is formed. Then, the layer ML is further stacked on the layers ML formed so far to shape the three-dimensional shaped object.

For example, the control unit 300 may temporarily interrupt the discharge of the shaping material from the nozzle 61 when the nozzle 61 moves in the Z direction after one layer ML is completely formed or when there are a plurality of independent shaping regions in each layer. In this case, the flow path 65 is closed by the discharge adjustment unit 70 to stop the discharge of the shaping material MM from the nozzle opening 62, and the shaping material in the nozzle 61 is temporarily absorbed by the absorption unit 75. After changing the position of the nozzle 61, the control unit 300 discharges the shaping material in the absorption unit 75 while opening the flow path 65 by the discharge adjustment unit 70, so that deposition of the shaping material MM from a changed position of the nozzle 61 is resumed.

Figure 6:
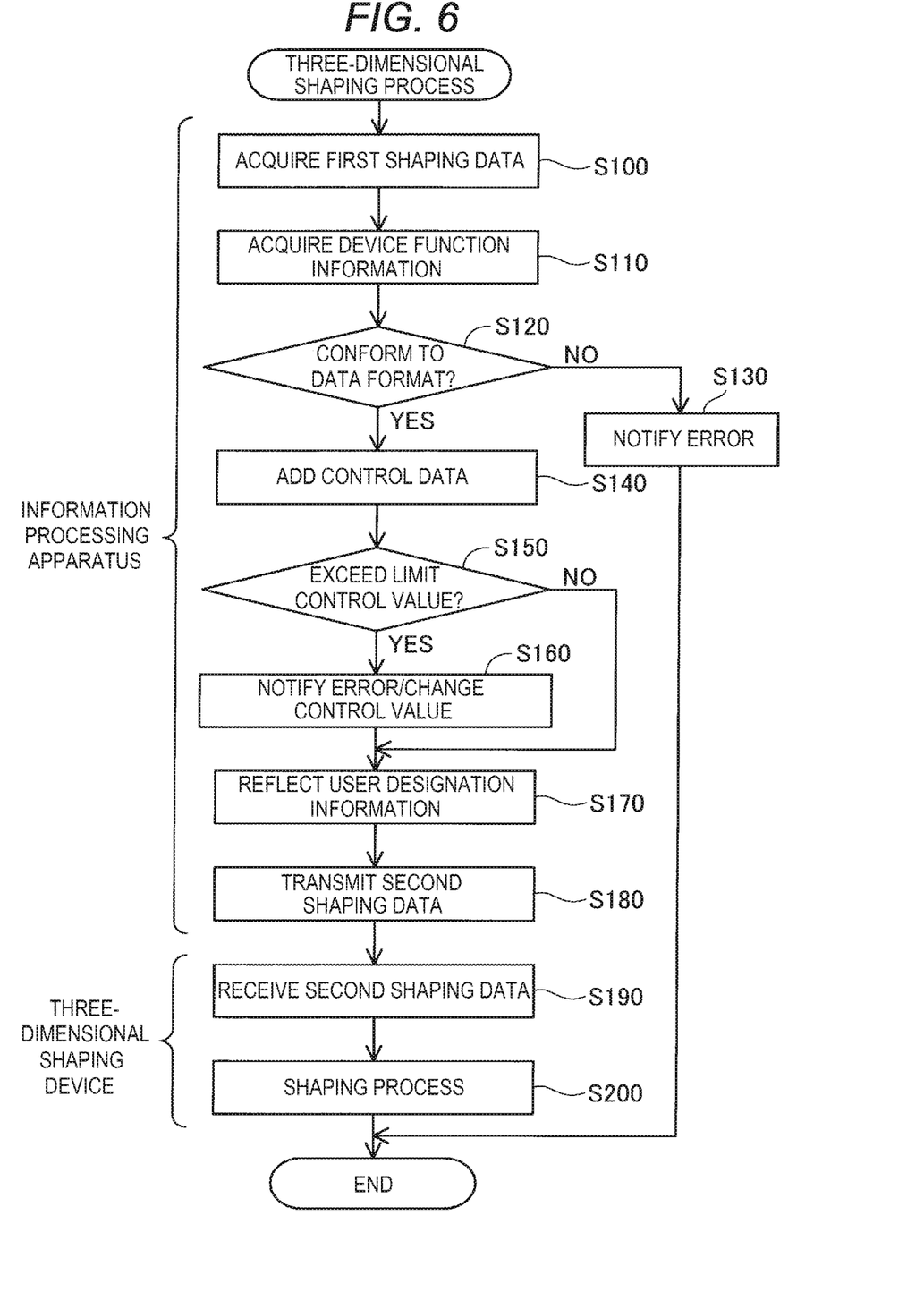
FIG. 6 is a flowchart of a three-dimensional shaping process.

FIG. 6 is a flowchart of a three-dimensional shaping process executed in the three-dimensional shaping system 10. The three-dimensional shaping process is a process for implementing a method for manufacturing a three-dimensional shaped object. In the three-dimensional shaping process, processing from step S100 to step S180 shown in FIG. 6 is executed in the information processing apparatus 400, and processing from step S190 to step S200 is executed in the three-dimensional shaping device.

In step S100, the first shaping data acquisition unit 411 of the information processing apparatus 400 acquires the first shaping data from another computer, a recording medium, or the storage device 420. Step S100 is also referred to as a first step. In step S100, the information processing apparatus 400 may acquire the first shaping data by using the slicer to generate the first shaping data from three-dimensional CAD data.

In step S110, the second shaping data generation unit 412 acquires the device function information including the information on the functional units included in the three-dimensional shaping device 100. In the present embodiment, the device function information is stored in the storage device 320 included in the control unit 300 of the three-dimensional shaping device 100. The second shaping data generation unit 412 acquires the device function information from the control unit 300 of the three-dimensional shaping device 100. In another embodiment, the second shaping data generation unit 412 may acquire the device function information from the storage device 420 included in the information processing apparatus 400, or may acquire the device function information from another computer or a recording medium.

Figure 7:
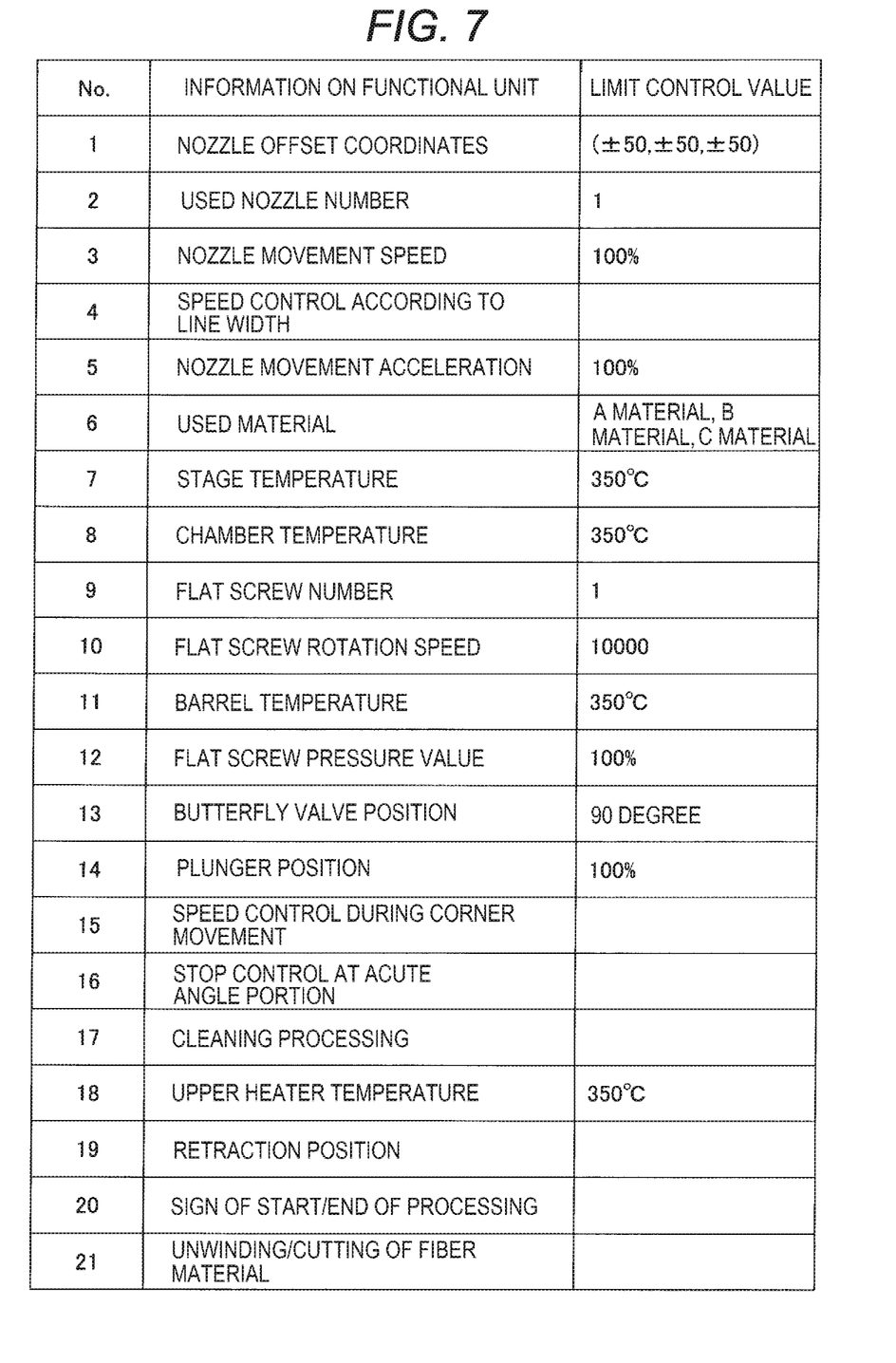
FIG. 7 is a diagram showing an example of device function information.

FIG. 7 is a diagram showing an example of the device function information. The device function information includes information on the functional units specific to the three-dimensional shaping device 100. The three-dimensional shaping device 100 is formed to be capable of receiving designation of a command, the control data, and a control value for controlling each functional unit included in the device function information. In the present embodiment, the device function information includes at least one of information on the discharge control unit 77, information on the plasticizing unit 30, information on the heaters that heat the shaping material, and information on the fiber supply unit 80.

The information on the discharge control unit 77 includes, for example, at least one of a "butterfly valve position" and a "plunger position".

The information on the plasticizing unit 30 includes at least a part of a "used material", a "flat screw number", a "flat screw rotation speed", and a "flat screw pressure value".

The information on the heaters includes at least a part of a "stage temperature", a "chamber temperature", a "barrel temperature", and an "upper heater temperature".

The information on the fiber supply unit 80 includes at least one of "unwinding of the fiber material from the fiber supply unit 80" and "cutting of the fiber by the fiber cutting mechanism 82".

Other than the above, the device function information includes, for example, "nozzle offset coordinates", "used nozzle number", "nozzle movement speed", "speed control according to a line width", "nozzle movement acceleration", "speed control during corner movement", "stop control at an acute angle portion", "cleaning processing", "retraction position", and "sign of start/end of processing".

In the present embodiment, in the device function information, limit values of the control value for controlling these functional units are recorded in association with the respective information on the functional units. The limit value of the control value indicates an upper limit value or a lower limit value of the control value. The limit value of the control value is also referred to as a limit control value.

In step S120 of FIG. 6, the second shaping data generation unit 412 determines whether the device function information acquired in step S110 conforms to a data format of the first shaping data. Step S120 is also referred to as a determination step. When it is determined that the device function information does not conform to the data format of the first shaping data, the second shaping data generation unit 412 notifies an error and ends the three-dimensional shaping process in step S130. The second shaping data generation unit 412 notifies an error by, for example, displaying a message indicating that the device function information does not conform to the data format on the display unit 450. The case where the device function information does not conform to the data format of the first shaping data is, for example, a case where the device function information is information indicating a function of an optical shaping type of device or an inkjet type of device even though the data format of the first shaping data is a data format of the material extrusion method. The first shaping data and the device function information may be added with header information indicating the data formats of the first shaping data and the device function information in order to easily identify the data formats.

When it is determined in step S120 that the device function information conforms to the data format of the first shaping data, the second shaping data generation unit 412 executes control data addition processing of adding the control data for controlling the functional units of the three-dimensional shaping device 100 to the first shaping data based on the device function information in step S140.

Figure 8:
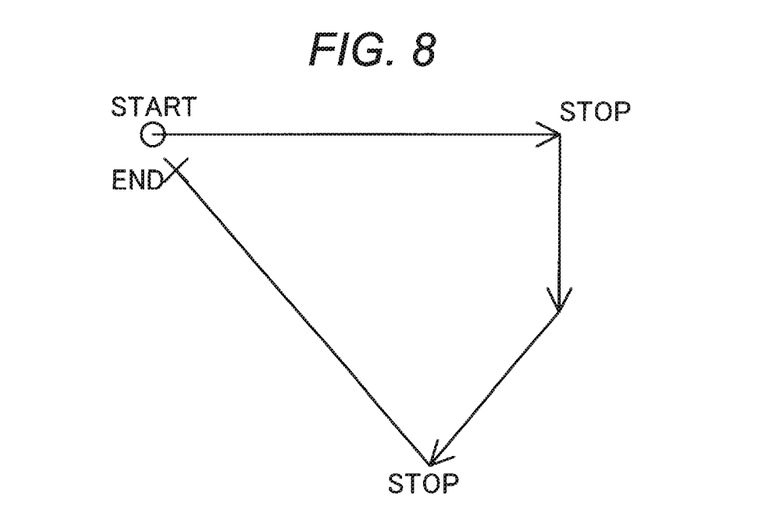
FIG. 8 is an illustrative diagram showing an example of control data addition processing.

FIG. 8 is an illustrative diagram showing an example of the control data addition processing. In the present embodiment, when the "stop control at an acute angle portion" is included in the device function information, a stop command is added as the control data to the first shaping data. Specifically, the second shaping data generation unit 412 determines whether an angle at which two continuous partial paths are coupled is an acute angle, and when the coupled angle is an acute angle, the second shaping data generation unit 412 temporarily stops the movement of the nozzle 61 at a coupled position of the two partial paths and adds the stop command to temporarily close the discharge adjustment unit 70. In FIG. 8, "STOP" is shown at a position on a path to which the stop command is added.

Figure 9:
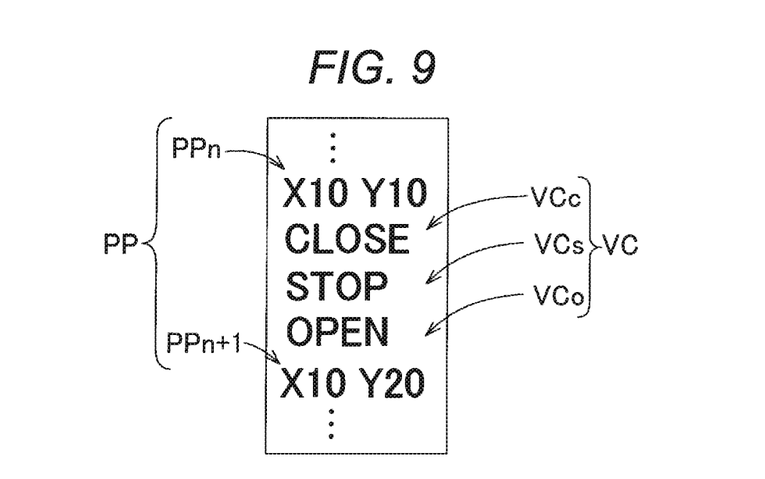
FIG. 9 is a diagram showing an example in which a stop command is added to the first shaping data.

FIG. 9 is a diagram showing an example in which the stop command is added to the first shaping data. The stop command VC includes a close command VCc, a movement stop command VCs, and an open command VCo in this order. The close command VCc indicates a command for causing the discharge adjustment unit 70 to close the flow path 65 and stopping the discharge of the shaping material from the nozzle 61. The movement stop command VCs indicates a command to stop the movement of the nozzle 61.

The movement stop command VCs may include a parameter indicating a stop time. When the parameter indicating the stop time is not included, the movement stop command VCs indicates a command to stop the movement of the nozzle 61 for a predetermined time. The open command VCo indicates a command for causing the discharge adjustment unit 70 to open the flow path 65 and allowing the discharge of the shaping material from the nozzle 61. In this manner, by adding the stop command VC between the path parameters PP, the movement of the nozzle 61 is temporarily stopped and the discharge of the shaping material is temporarily stopped at the coupled position between the partial paths.

In the control data addition processing according to the present embodiment, in addition to the above, for example, when the "cleaning process" is included in the device function information, a command for discarding the shaping material in the nozzle 61 at a predetermined position every time a predetermined number of layers is stacked is added as the control data. When the device function information includes "cutting of the fiber by the fiber cutting mechanism 82", a command for cutting the fiber by the fiber cutting mechanism 82 after the discharge of the shaping material is stopped is added as the control data. As described above, in the control data addition processing of step S140 of FIG. 6, various types of control data are automatically added to the first shaping data based on the information included in the device function information.

After the control data addition processing is executed, in step S150, the second shaping data generation unit 412 determines whether the control value of each functional unit included in the first shaping data exceeds the limit control value of the functional unit included in the device function information. For example, when the first shaping data acquired in step S100 already includes the control data designating the "stage temperature", the "chamber temperature", the "barrel temperature", and the "upper heater temperature", when it is determined that these values exceed the limit control values of the respective functional units recorded in the device function information acquired in step S110, the second shaping data generation unit 412 notifies an error using the display unit 450 and changes these pieces of control data to values that do not exceed the limit control values, more specifically, values of the limit control values in step S160. For example, when the already designated control data is "360° C." and the limit control value included in the device function information is "350° C.", the control data is changed to "350° C.". When the second shaping data generation unit 412 determines that the control values of the respective functional units included in the first shaping data do not exceed the limit control values of the functional units included in the device function information, the second shaping data generation unit 412 skips the processing of step S160. In step S160, the second shaping data generation unit 412 may omit the notification of the error. Step S160 and step S140 described above are also collectively referred to as a second step.

In the processing of step S160, when the control value exceeds the limit control value beyond a predetermined range, an error may be notified. When the control value exceeds the limit control value beyond the predetermined range, the control value may not be automatically corrected to the limit control value, and designation of the control value may be received from a user. In this manner, it is possible to prevent the three-dimensional shaping device from performing an unintended operation due to the control value being automatically changed.

In step S170, the second shaping data generation unit 412 executes processing of reflecting user designation information. This processing is processing for changing the first shaping data based on the device function information and the information designated by the user. For example, when the user designates a temperature of the heater such as the stage temperature or the chamber temperature included in the device function information, the second shaping data generation unit 412 adds control data for designating a set temperature of each heater to the temperature designated by the user to the first shaping data in step S170. For example, when the user designates a rotation speed of the flat screw 40, the second shaping data generation unit 412 adds control data for setting the rotation speed of the flat screw 40 to the rotation speed designated by the user to the first shaping data in step S170. In step S170, when the temperature of the heater and the rotation speed of the flat screw are already set in the first shaping data, the control data thereof may be changed to values designated by the user.

By the processing from step S100 to step S170 described above, the control data is added to the first shaping data or the control data included in the first shaping data is changed, so that the second shaping data is generated from the first shaping data according to the device function information acquired from the three-dimensional shaping device 100. In step S180, the second shaping data generation unit 412 transmits the second shaping data generated in the above manner to the control unit 300 of the three-dimensional shaping device 100.

In step S190, the second shaping data acquisition unit 311 of the control unit 300 receives the second shaping data from the information processing apparatus 400.

In step S200, the shaping control unit 312 of the control unit 300 executes a shaping process of shaping a three-dimensional shaped object on the stage 210 by discharging the shaping material from the discharge unit 60 and stacking layers while moving the discharge unit 60 with respect to the stage 210 according to the second shaping data. In this shaping process, the second shaping data acquisition unit 311 interprets various types of commands, control data, and control values included in the second shaping data, and controls, according to the commands, the control data, and the control values, the respective functional units such as the shaping unit 110, the moving mechanism 230, the discharge control unit 77, the fiber supply unit 80, the upper heater 120, the chamber heater 130, the stage heater 212, and the barrel heater 58. Step S200 is also referred to as a third step.

According to the three-dimensional shaping system 10 of the present embodiment described above, it is possible to generate the second shaping data for shaping the three-dimensional shaped object by adding the control data to the first shaping data PD including the path information and the discharge amount information or changing the control data included in the first shaping data PD based on the device function information on the three-dimensional shaping device 100. Therefore, it is possible to save a lot of time and effort of manually adding the control data to use the function of the three-dimensional shaping device, and it is possible to efficiently shape the three-dimensional shaped object. In addition, since the control data for controlling the function of the three-dimensional shaping device can be added to the first shaping data after the first shaping data is generated or the first shaping data is acquired, it is not necessary to re-generate the first shaping data itself when the control data is only changed or corrected. Therefore, a time required to generate the second shaping data can be reduced.

In addition, in the present embodiment, since the device function information is acquired from the three-dimensional shaping device 100, for example, it is possible to save a lot of time and effort of selecting the device function information on the corresponding three-dimensional shaping device from a plurality of pieces of device function information.

In the present embodiment, since the error is notified when the device function information acquired from the three-dimensional shaping device 100 does not conform to the data format of the first shaping data, it is possible to prevent the three-dimensional shaping device 100 from malfunctioning due to erroneous shaping data.

In the present embodiment, since the second shaping data can be generated based on the device function information and the information designated by the user, for example, various parameters such as the temperature of the heater and the rotation speed of the flat screw can be designated by the user himself/herself. Therefore, manufacturing conditions of the three-dimensional shaped object can be flexibly changed.

In the present embodiment, when the control value of the functional unit included in the first shaping data exceeds the limit control value of the functional unit included in the device function information, the control value included in the first shaping data is automatically changed. Therefore, it is possible to prevent the three-dimensional shaping device 100 from malfunctioning due to the control value exceeding the limit control value, and it is possible to appropriately operate the three-dimensional shaping device 100.

B. Other Embodiments (B1) In the above-described embodiment, the configuration of the functional units of the three-dimensional shaping device 100 shown in FIG. 1 may be freely changed. For example, the three-dimensional shaping device 100 may not include at least a part of the upper heater 120, the chamber heater 130, the stage heater 212, the fiber supply unit 80, the discharge adjustment unit 70, and the absorption unit 75.

(B2) In the above-described embodiment, the processing in step S120 in the three-dimensional shaping process shown in FIG. 6, that is, the processing of determining whether the device function information conforms to the data format of the first shaping data may be omitted.

(B3) In the above-described embodiment, one of the control data addition processing in step S140 and the control value changing processing in step S160 of the three-dimensional shaping process shown in FIG. 6 may be omitted.

(B4) In the above-described embodiment, the processing of step S170 of the three-dimensional shaping process shown in FIG. 6, that is, the processing of reflecting the user designation information may be omitted. That is, the second shaping data generation unit 412 may not receive the designation of the control value from the user.

(B5) In the above-described embodiment, the discharge of the shaping material is temporarily stopped by driving both the discharge adjustment unit 70 and the absorption unit 75. Alternatively, for example, only the discharge adjustment unit 70 or only the absorption unit 75 may be operated to temporarily stop the discharge.

(B6) In the above-described embodiment, the material is plasticized by the flat screw 40 in the shaping unit 110. Alternatively, for example, the shaping unit 110 may plasticize the material by rotating an in-line screw, or may plasticize a filament-shaped material with a heater.

(B7) In the above-described embodiment, the flow rate of the shaping material is adjusted by using the discharge adjustment unit 70 formed by the butterfly valve. Alternatively, the flow rate of the shaping material may be adjusted by controlling the rotation speed of the flat screw 40.

(B8) In the above-described embodiment, the material extrusion method in which the plasticized materials are stacked is described as an example, but various methods such as an inkjet method, a direct metal deposition (DMD) method, and a binder jet method can be applied. For example, the second shaping data may be generated by acquiring the first shaping data in an inkjet format and adding control data for controlling a functional unit to the first shaping data or changing the control data included in the first shaping data based on device function information including information on the functional unit included in an inkjet device.

(B9) In the above-described embodiment, the pellet-shaped ABS resin is used as the raw material to be supplied to the material supply unit 20. On the other hand, the three-dimensional shaping device 100 can shape the three-dimensional shaped object by using various materials such as a thermoplastic material, a metal material, and a ceramic material as a main material. The "main material" refers to a material serving as a center component for forming a shape of a three-dimensional shaped object, and refers to a material having a content of 50 wt % or more in the three-dimensional shaped object. The above-described shaping material includes a material obtained by melting the main material alone or a material obtained by melting the main material and a part of components contained in the main material into a paste form.

When the thermoplastic material is used as the main material, the shaping material is generated by plasticizing the material in the plasticizing unit 30.

As the thermoplastic material, for example, the following thermoplastic resin materials can be used.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyether imide, and polyether ether ketone Additives such as a wax, a flame retardant, an antioxidant, and a heat stabilizer may be mixed into the thermoplastic material in addition to a pigment, a metal, a ceramic. In the plasticizing unit 30, the thermoplastic material is converted into a melted state by being plasticized by the rotation of the flat screw 40 and the heating of the barrel heater 58. After the shaping material generated by melting the thermoplastic material is discharged from the nozzle 61, the material is cured due to a reduction in temperature.

It is desirable that the thermoplastic material is discharged from the nozzle 61 in a state in which the material is heated to a temperature equal to or higher than the glass transition point thereof and is completely melted. For example, a glass transition point of the ABS resin is about 120° C., and it is desirable that the ABS resin is ejected from the nozzle 61 at about 200° C.

In the three-dimensional shaping device 100, for example, the following metal material may be used as the main material instead of the above-described thermoplastic material. In this case, it is desirable that a component to be melted at the time of generating the shaping material is mixed with a powder material obtained by converting the following metal material into a powder, and the mixture is put into the plasticizing unit 30 as a raw material.

Examples of Metal Material

Single metals such as magnesium (Mg), iron (Fe), cobalt (Co), chromium (Cr), aluminum (Al), titanium (Ti), copper (Cu), and nickel (Ni), or an alloy containing one or more of these metals Examples of Alloy Maraging steel, stainless steel, cobalt chrome molybdenum, a titanium alloy, a nickel alloy, an aluminum alloy, a cobalt alloy, and a cobalt chromium alloy In the three-dimensional shaping device 100, a ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the above-described metal material or ceramic material is used as the main material, the shaping material disposed on the stage 210 may be cured by, for example, sintering with laser irradiation or warm air.

A powder material of the metal material or the ceramic material to be put into the material supply unit 20 as the raw material may be a mixed material obtained by mixing a plurality of types of powders of a single metal or an alloy with powders of a ceramic material. The powder material of the metal material or the ceramic material may be coated with, for example, a thermoplastic resin shown in the above-described example, or a thermoplastic resin other than those in the above-described example. In this case, the thermoplastic resin may be melted to exhibit fluidity in the plasticizing unit 30.

For example, the following solvents may be added to the powder material of the metal material or the ceramic material to be put into the material supply unit 20 as the raw material. One solvent or a combination of two or more solvents selected from the following solvents may be used.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, isopropyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (such as tetrabutylammonium acetate); and ionic liquids such as butyl carbitol acetate In addition, for example, the following binders may be added to the powder material of the metal material or the ceramic material to be put into the material supply unit 20 as the raw material.

Examples of Binder

An acrylic resin, an epoxy resin, a silicone resin, a cellulose-based resin or other synthetic resins, and a polylactic acid (PLA), polyamide (PA), polyphenylene sulfide (PPS), polyether ether ketone (PEEK) or other thermoplastic resins C. Other Aspects The present disclosure is not limited to the embodiments described above, and can be implemented in various forms without departing from the scope of the present disclosure. In order to solve a part of or all of above problems, or to achieve a part of or all of above effects, technical features in the above-described embodiments corresponding to technical features described below can be replaced or combined as appropriate. Technical features can be deleted as appropriate unless the technique features are described as essential in the present specification.

(1) According to a first aspect of the present disclosure, there is provided a method for manufacturing a three-dimensional shaped object that manufactures a three-dimensional shaped object by stacking layers using a three-dimensional shaping device. This method for manufacturing a three-dimensional shaped object includes: a first step of acquiring first shaping data including path information indicating a movement path of a discharge unit that moves while discharging a shaping material, and discharge amount information indicating a discharge amount of the shaping material in the movement path; a second step of generating, based on device function information including information on a functional unit included in the three-dimensional shaping device, second shaping data by adding control data for controlling the functional unit to the first shaping data or by changing the control data included in the first shaping data; and a third step of controlling the three-dimensional shaping device in accordance with the second shaping data to shape the three-dimensional shaped object.

According to such an aspect, it is possible to generate the second shaping data for shaping the three-dimensional shaped object by adding the control data to the first shaping data including the path information and the discharge amount information or changing the control data included in the first shaping data based on the device function information on the three-dimensional shaping device, and thus it is possible to save a lot of time and effort of manually adding the control data to use the function of the device, and it is possible to efficiently shape the three-dimensional shaped object.

(2) In the above aspect, the method may further include acquiring the device function information from the three-dimensional shaping device. According to such an aspect, it is possible to save a lot of time and effort of selecting the device function information on the corresponding three-dimensional shaping device from a plurality of pieces of device function information.

(3) In the above aspect, the method may further include a determination step of determining whether the acquired device function information conforms to a data format of the first shaping data.

(4) In the above aspect, the determination step may include a step of notifying an error when it is determined that the device function information does not conform to the data format of the first shaping data. According to such an aspect, it is possible to prevent the three-dimensional shaping device from malfunctioning.

(5) In the above aspect, in the second step, the second shaping data may be generated based on the device function information and information designated by a user. According to such an aspect, for example, manufacturing conditions of the three-dimensional shaped object can be flexibly changed.

(6) In the above aspect, the functional unit may include at least one of a discharge control unit configured to control discharge of the shaping material, a plasticizing unit configured to plasticize a raw material to generate the shaping material, a heater configured to heat the shaping material, and a fiber supply unit configured to supply a fiber to the shaping material.

(7) In the above aspect, in the second step, when a control value of the functional unit included in the first shaping data exceeds a limit control value of the functional unit included in the device function information, the control value included in the first shaping data may be changed to a value that does not exceed the limit control value. According to such an aspect, it is possible to appropriately operate the three-dimensional shaping device.

(8) In the above aspect, in the second step, an error may be notified when a control value of the functional unit included in the first shaping data exceeds a limit control value of the functional unit included in the device function information. According to such an aspect, it is possible to prevent the three-dimensional shaping device from performing an unintended operation due to the control value being automatically changed.

(9) According to a second aspect of the present disclosure, a three-dimensional shaping system is provided. This three-dimensional shaping system includes an information processing apparatus, and a three-dimensional shaping device. The information processing apparatus includes: a first shaping data acquisition unit configured to acquire first shaping data including path information indicating a movement path of a discharge unit that moves while discharging a shaping material, and discharge amount information indicating a discharge amount of the shaping material in the movement path; and a second shaping data generation unit configured to generate, based on device function information including information on a functional unit included in the three-dimensional shaping device, second shaping data by adding control data for controlling the functional unit to the first shaping data or by changing the control data included in the first shaping data. The three-dimensional shaping device includes: a second shaping data acquisition unit configured to acquire the second shaping data; and a shaping control unit configured to shape a three-dimensional shaped object on a stage by discharging the shaping material from the discharge unit and stacking layers while moving the discharge unit with respect to the stage according to the second shaping data.

(10) According to a third aspect of the present disclosure, an information processing apparatus is provided. The information processing apparatus includes: a first shaping data acquisition unit configured to acquire first shaping data including path information indicating a movement path of a discharge unit that moves while discharging a shaping material, and discharge amount information indicating a discharge amount of the shaping material in the movement path; and a second shaping data generation unit configured to generate, based on device function information including information on a functional unit included in the three-dimensional shaping device, second shaping data by adding control data for controlling the functional unit to the first shaping data or by changing the control data included in the first shaping data.

What is claimed is:

1. A method for manufacturing a three-dimensional shaped object that manufactures a three-dimensional shaped object by stacking layers using a three-dimensional shaping device, the method comprising:
    a first step of acquiring first shaping data including path information indicating a movement path of a discharge unit that moves while discharging a shaping material, and discharge amount information indicating a discharge amount of the shaping material in the movement path;
    a second step of generating, based on device function information including information on at least one functional unit included in the three-dimensional shaping device, second shaping data by adding control data for controlling the at least one functional unit to the first shaping data or by changing the control data included in the first shaping data, the at least one functional unit comprising an absorption unit configured to temporarily absorb the shaping material; and
    a third step of controlling the three-dimensional shaping device in accordance with the second shaping data to shape the three-dimensional shaped object.

2. The method for manufacturing a three-dimensional shaped object according to claim 1, further comprising:
    acquiring the device function information from the three-dimensional shaping device.

3. The method for manufacturing a three-dimensional shaped object according to claim 1, further comprising:
    a determination step of determining whether the acquired device function information conforms to a data format of the first shaping data.

4. The method for manufacturing the three-dimensional object according to claim 3, wherein
    in the determination step, an error is notified when it is determined that the device function information does not conform to the data format of the first shaping data.

5. The method for manufacturing a three-dimensional shaped object according to claim 1, wherein
    in the second step, the second shaping data is generated based on the device function information and information designated by a user.

6. The method for manufacturing a three-dimensional shaped object according to claim 1, wherein
    the at least one functional unit further includes at least one of a discharge control unit configured to control discharge of the shaping material, a plasticizing unit configured to plasticize a raw material to generate the shaping material, a heater configured to heat the shaping material, and a fiber supply unit configured to supply a fiber to the shaping material.

7. The method for manufacturing a three-dimensional shaped object according to claim 1, wherein
    in the second step, when a control value of the at least one functional unit included in the first shaping data exceeds a limit control value of the at least one functional unit included in the device function information, the control value included in the first shaping data is changed to a value that does not exceed the limit control value.

8. The method for manufacturing a three-dimensional shaped object according to claim 1, wherein
    in the second step, an error is notified when a control value of the at least one functional unit included in the first shaping data exceeds a limit control value of the at least one functional unit included in the device function information.

9. A three-dimensional shaping system comprising:
an information processing apparatus; and
a three-dimensional shaping device, wherein
the information processing apparatus includes
- a first shaping data acquisition unit configured to acquire first shaping data including path information indicating a movement path of a discharge unit that moves while discharging a shaping material, and discharge amount information indicating a discharge amount of the shaping material in the movement path, and
- a second shaping data generation unit configured to generate, based on device function information including information on at least one functional unit included in the three-dimensional shaping device, second shaping data by adding control data for controlling the at least one functional unit to the first shaping data or by changing the control data included in the first shaping data, the at least one functional unit comprising an absorption unit configured to temporarily absorb the shaping material, and the three-dimensional shaping device includes
- a second shaping data acquisition unit configured to acquire the second shaping data, and
- a shaping control unit configured to shape a three-dimensional shaped object on a stage by discharging the shaping material from the discharge unit and stacking layers while moving the discharge unit with respect to the stage according to the second shaping data.

10. An information processing apparatus comprising:
a first shaping data acquisition unit configured to acquire first shaping data including path information indicating a movement path of a discharge unit that moves while discharging a shaping material, and discharge amount information indicating a discharge amount of the shaping material in the movement path; and
a second shaping data generation unit configured to generate, based on device function information including information on at least one functional unit included in a three-dimensional shaping device, second shaping data by adding control data for controlling the at least one functional unit to the first shaping data or by changing the control data included in the first shaping data, the at least one functional unit comprising an absorption unit configured to temporarily absorb the shaping material.

* * * * *